United States Patent [19]

Pacansky

[11] 4,059,554

[45] Nov. 22, 1977

[54] STABILIZED EMULSION INKS

[75] Inventor: Thomas John Pacansky, Penfield, N.Y.

[73] Assignee: Xerox Corporation, Stamford, Conn.

[21] Appl. No.: 691,058

[22] Filed: May 28, 1976

[51] Int. Cl.$^2$ ............................................. C08L 25/08
[52] U.S. Cl. .................. 260/29.6 WQ; 260/29.6 NR; 260/29.6 RW
[58] Field of Search .............. 260/29.6 WQ, 29.6 NR, 260/29.6 RW, 31.6, 33.4 R, 895; 106/27, 28, 29, 31, 32

[56] References Cited

U.S. PATENT DOCUMENTS

| 3,266,914 | 8/1966 | Varron | 106/32 |
|---|---|---|---|
| 3,393,162 | 7/1968 | Cox et al. | 260/29.6 RW |
| 3,546,321 | 12/1970 | Jabloner et al. | 260/895 |
| 3,615,750 | 10/1971 | Blair | 106/27 |
| 3,948,866 | 4/1976 | Pennewiss et al. | 260/29.6 RW |
| 3,993,493 | 11/1976 | McLaren et al. | 106/22 |

*Primary Examiner*—M. J. Welsh
*Attorney, Agent, or Firm*—James J. Ralabate; James P. O'Sullivan; Donald M. MacKay

[57] ABSTRACT

Stabilized alcohol or water in oil ink emulsions are provided comprising: a pigment, from 20 to 40% by weight resin of a block or graft copolymer having one type of polar segment miscible with water and alkyl alcohols of from 2 to 6 carbon atoms, and another type of non-polar segment which can be absorbed on the pigment and is miscible with the non-polar components of the ink, said copolymer having a number average molecular weight of from 20,000 to 40,000; and a vehicle for said resin and pigment comprising polar and non-polar solvents.

9 Claims, No Drawings

STABILIZED EMULSION INKS

BACKGROUND OF THE INVENTION

Typical emulsion inks have emulsified droplets of alcohol or water stabilized with surfactants within a matrix of an oil and an oil soluble resin. Some difficulties encountered with emulsion inks have included a difficulty in controlling and reproducing emulsions. In addition, emulsion inks have tended to breakdown either on storage or prematurely during milling on an ink press which results in poor image density and difficulty in transferring ink from roll to roll. Extremely stable ink emulsions, however, have tended to give poor printing results of high background. Accordingly, this invention is directed to emulsion inks which obviate or reduce the above problems.

BRIEF DESCRIPTION OF THE INVENTION

This invention is directed to stabilized alcohol or water in oil ink emulsions and more particularly to said emulsions comprising: (a) a coloring amount of a pigment, (b) from 20 to 40% by weight resin of a block or graft copolymer having one type of polar segment miscible with water and alkyl alcohols from 2 to 6 carbon atoms, and another type of non-polar segment which can be absorbed on the pigment and which are miscible with the non-polar components of the ink, said copolymer having a number average molecular weight of from 20,000 to 40,000 and (c) a vehicle for said resin and pigment comprising polar and non-polar solvents.

DETAILED DESCRIPTION OF THE INVENTION

The particular copolymers employed in the invention include a number of previously known materials. The polar segments can be provided by poly(vinylpyridine), poly(ethylene oxide),poly(acrylic acid), poly(methacrylic acid), poly(vinyl alcohol), poly(N-vinyl pyrrolidone) and the like blocks. Non-polar blocks are provided by styrene, alkylacrylates, alkylmethacrylates with the alkyl portion having aromatic or linear or branched groups of from 1 to 10 carbon atoms as well as butadiene, isoprene and the like.

The amount of each segment in the copolymer is not critical. However, best results are obtained when the copolymer contains from about 20 to about 50% of the polar segments and perferably from between about 30 to about 40% of the polar segments. The copolymers can be prepared by well known methods such as free radical polymerization, anionic polymerization and condensation polymerization. Briefly, free radical polymerization consists of the addition of a free radical initiator (such as a peroxide or azo compound) to a vinyl monomer in an inert atmosphere with or without a solvent followed by heating of the mixture to cause the polymerization. Anionic polymerization consists of the addition of an initiator (such as sodium napthylene) to a vinyl monomer in an inert atmosphere with or without an inert solvent. Generally, polymerization occurs spontaneously with or without the external addition of heat. Condensation polymerization consists of the reaction of a diacid with a dialcohol or diamine in an inert solvent. Graft copolymers can be prepared by the same general methods.

Alkyl alcohols of from 2 to 6 carbon atoms which are contemplated as a polar solvent for the vehicle include 1,3-butanediol, 1,5-pentane diol, 2,2'-oxydiethanol, sorbitol, mannitol, ethylene glycol, glycerine, 2,5-hexane diol and propylene glycol with the latter four alcohols being preferred. In addition, other hydrophilic ingredients such as alcohols with 2 to 6 carbons or water may be added in quantities up to 10 to 20% by weight.

Non-polar solvents for use in the invention include bodied linseed oil, castor oil, hydrocarbon oils and the like.

Conventional pigments can be employed, such as carbon black, metal oxides such as iron oxide and organic pigments such as phthalocyanine blue, phthalocyanine green, benzidine yellow and benzidine orange and the like.

Additional conventional ingredients may be added without significantly changing the stability of the emulsion. These ingredients are commonly used in inks and include such materials such as resins, oils, varnishes, gels, waxes and the like.

Other conventional ingredients can be employed such as drying agents such as metal soaps, fungicides, antioxidants, etc. but are not required. Generally, only a small amount such as 1 or 2% of each ingredient or less is employed.

The block and graft copolymers used in the ink should comprise from between about 20 to 40% by weight, the pigment of from between about 10 to 25% by weight with an optimum of 16 to 20% and the liquid portion between about 25 to 50% by weight with a preferred amount comprising 20 to 40% polar solvent and 5 to 20% non-polar oil or solvent.

The following examples will serve to illustrate the invention and preferred embodiments thereof. All parts and percentages in said examples and elsewhere in the specification and claims are by weight unless otherwise specified.

EXAMPLE I

A styrene-vinyl pyrrolidone block copolymer is obtained by using a trisperoxide as the reaction initiator. The polymerization of styrene at 75° C gives polystyrene terminated with two peroxy groups. The peroxy end groups of the macromolecules are used for initiation of n-vinylpyrrolidone polymerization at 100° C.

EXAMPLE II

A polystyrene-poly (vinylpyridine) block copolymer was parpared by anionic polymerization by the method of Grosius et al, Makromol, Chem., 132, 35 (1970) using cumylpotassium as the initiator in tetrahydrofuran as the solvent. The poly (vinylpyridine) blocks were quaternized by addition of hydrogen bromide or linear alkyl bromides to the copolymer in solution in tetrahydrofuran. To this solution was added an equal amount by volume of benzene, the mixture condensed to 10% solids by rotary evaporization and the polymer was purified by precipitation into hexane.

EXAMPLE III

Ink compositions were employed containing the block copolymer having 30 to 40% polar segments of each of the previous two examples in an amount of 20 parts with 9 parts of an alkyd resin (Syntex 3409 sold by Celanese Corporation), 3 parts of a drying oil (Castor oil or linseed oil), 10 parts of a petroleum oil solvent containing 1 part of an antioxidant and 1 part of a fungicide with 16 parts of a carbon black pigment to provide a component I. The first component was then 3-roll milled to a small particle size ( $\leq 10 \mu$) and thoroughly mixed with a component 2 of 15 parts glycerine, 15 parts ethylene glycol and 10 parts block copolymer using a high speed mixer and allowed to set for approximately 1 to 7 days before use. The emulsions were used in lithographic printing with excellent results.

Having described the present invention with reference to these specific embodiments, it is to be understood that numerous variations can be made without departing from the spirit of the invention and it is intended to encompass such reasonable variations or equivalents within its scope.

What is claimed is:

1. A stabilized alcohol or water in oil ink emulsion comprising:
   a. a coloring amount of a pigment,
   b. from 20–40% by weight resin of a block or graft copolymer having one type of polar segment miscible with water and alcohols of from 2 to 6 carbon atoms, and another type of non-polar segment which can be absorbed on the pigment and is miscible with non-polar components of the ink, said copolymer having a number average molecular weight from 20,000 to 40,000 and
   a vehicle for said resin and pigment comprising a mixture of polar and non-polar solvents.

2. The composition of claim 1 wherein the pigment is present in an amount of from about 10 to 25% by weight of the ink.

3. The composition of claim 1 wherein the pigment is present in an amount of about 16% by weight of the ink.

4. The composition of claim 1 wherein the vehicle contains about 35% polar solvents and 10 to 20% non-polar solvents.

5. The composition of claim 1 wherein a polar alcohol solvent is present of from 2 to 6 carbon atoms.

6. The composition of claim 1 wherein the vehicle comprises water and an alcohol selected from ethylene glycol, propylene glycol, glycerol, and 2,5-hexane diol.

7. The composition of claim 1 wherein the copolymer is formed of polystyrene and poly(vinyl pyrrolidone).

8. The composition of claim 1 wherein the copolymer is formed of poly(methyl methacrylate) and poly(ethylene oxide).

9. The composition of claim 1 wherein the copolymer is formed of polystyrene and poly(vinyl N-alkyl-pyridinium bromide).